United States Patent [19]

Maeda et al.

[11] Patent Number: 5,193,209
[45] Date of Patent: Mar. 9, 1993

[54] MOBILE TELEPHONE SYSTEM FOR PRODUCING BUSYNESS INFORMATION FOR SPEECH CHANNELS

[75] Inventors: Koji Maeda; Shinji Kawamura, both of Tokyo, Japan

[73] Assignee: NEC Corporation, Japan

[21] Appl. No.: 515,453

[22] Filed: Apr. 27, 1990

[30] Foreign Application Priority Data

Apr. 27, 1989 [JP] Japan ................................ 1-106005
Apr. 27, 1989 [JP] Japan ................................ 1-106006

[51] Int. Cl.$^5$ .............................................. H04Q 7/00
[52] U.S. Cl. .................................. 455/34.2; 455/56.1; 455/58.1; 455/67.7
[58] Field of Search ....................... 455/33, 34, 54, 56, 455/58, 67, 226, 33.1, 34.2, 54.1, 56.1, 58.1, 67.1, 67.7, 226.4; 379/59, 60

[56] References Cited

U.S. PATENT DOCUMENTS

| | | | |
|---|---|---|---|
| 4,144,412 | 3/1979 | Ito et al. ................... | 455/56 |
| 4,376,310 | 3/1983 | Stackhouse et al. ........... | 455/34 |
| 4,658,435 | 4/1987 | Childress et al. ............ | 455/34 |
| 4,803,679 | 2/1989 | Shimizu ..................... | 455/56 |
| 4,875,231 | 10/1989 | Hara et al. ................ | 455/34 |

FOREIGN PATENT DOCUMENTS 3415473 10/1985 Fed. Rep. of Germany .
228433 12/1984 Japan .

Primary Examiner—Reinhard J. Eisenzopf
Assistant Examiner—Edward Urban
Attorney, Agent, or Firm—Ostrolenk, Faber, Gerb & Soffen

[57] ABSTRACT

On-board equipment for a mobile telephone system has a function of reporting the degree of busyness of message channels available in a service area. While the equipment is in a stand-by condition with no communication being held thereon, the degree of busyness is determined on the basis of electric field levels of individual message channels or control information sent from a control station. When the electric field levels are used to determine the degree of busyness, the electric fields of a plurality of message channels assigned to the service area are detected. If any of the message channels has an electric field level higher than a predetermined level, that message channel is determined to be busy. The rate of use of the message channels is calculated by using the number of assigned message channels and the number of occupied message channels. The calculated rate of use is displayed as information which is indicative of the busyness of the message channels. When the busyness is determined on the basis of control information, a lockout signal sent from the control station and indicative of the fact that no idle message channels are available is detected. The number of lockout signals having appeared within a predetermined period of time is determined and displayed as busyness information.

6 Claims, 5 Drawing Sheets

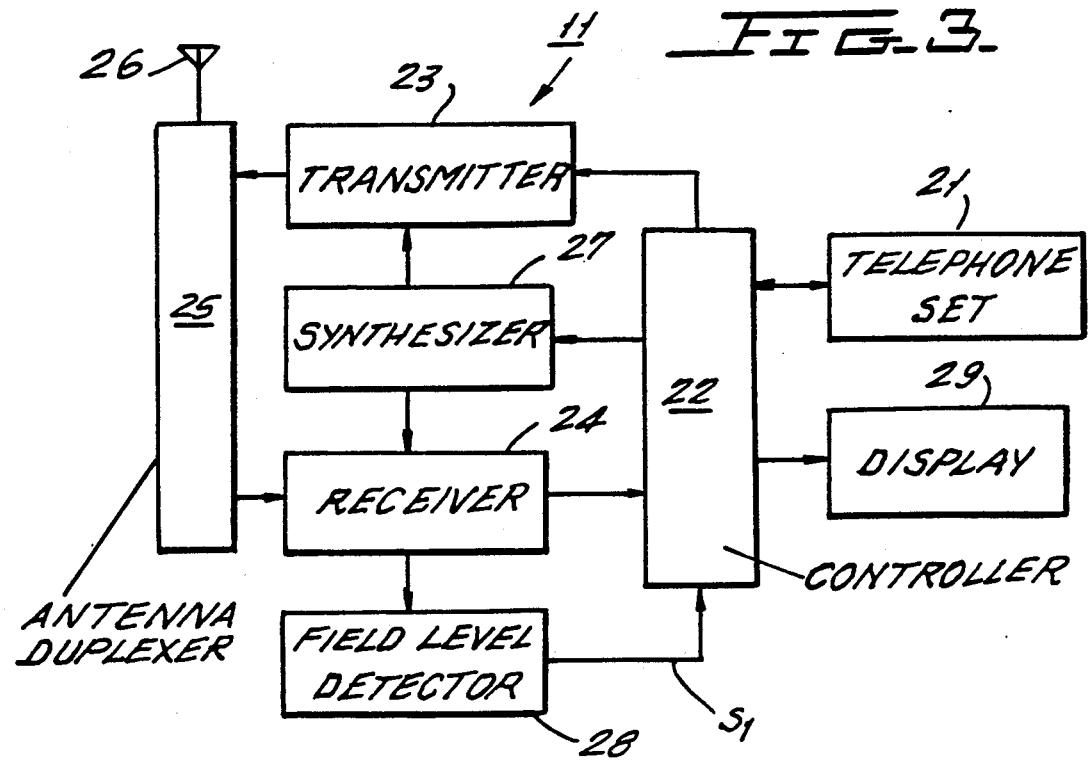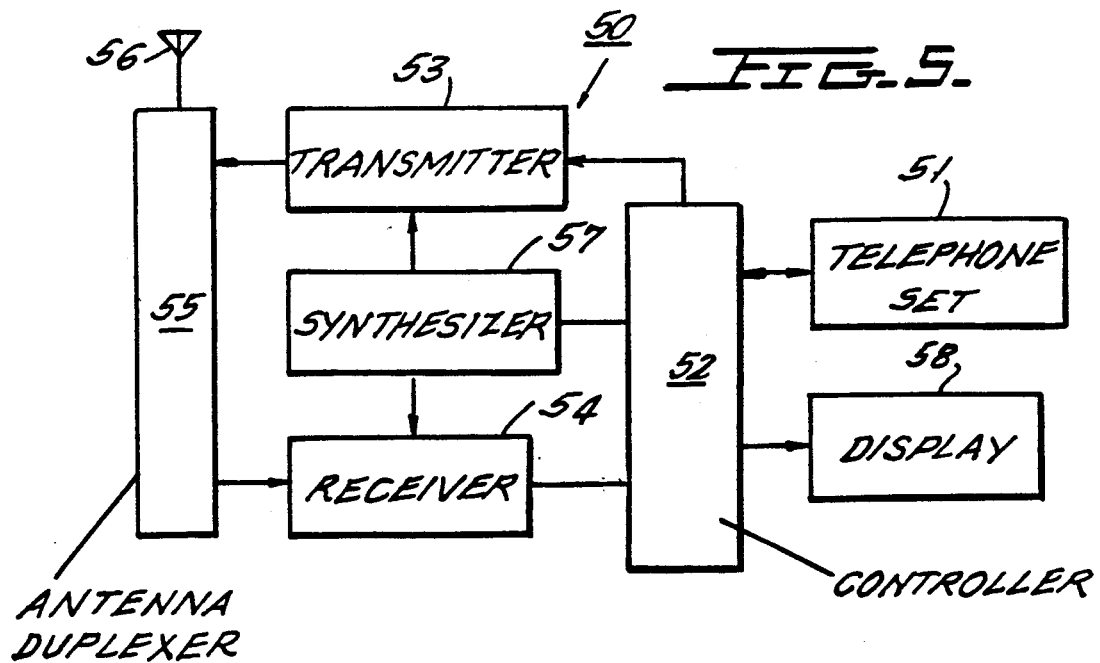

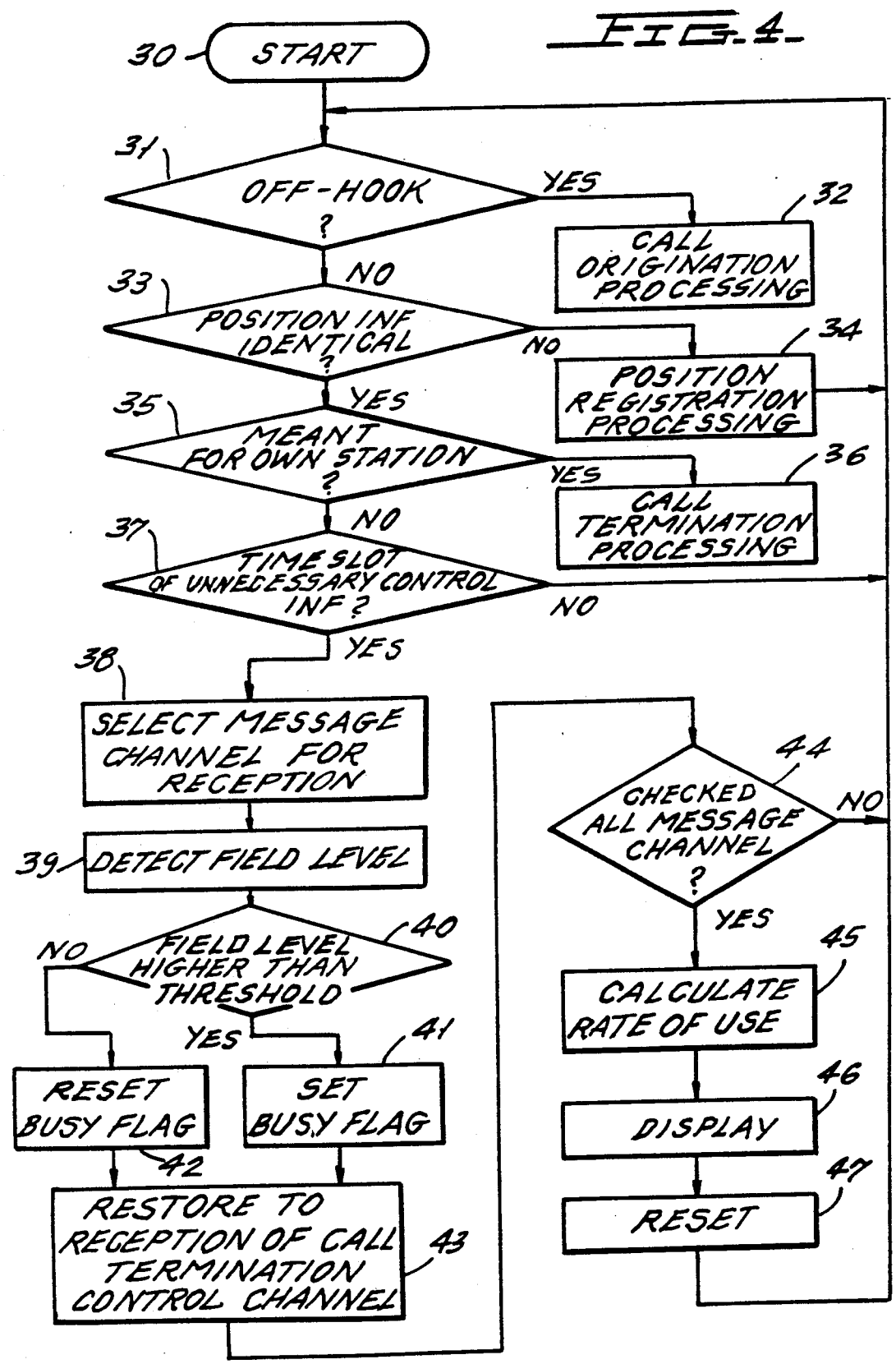

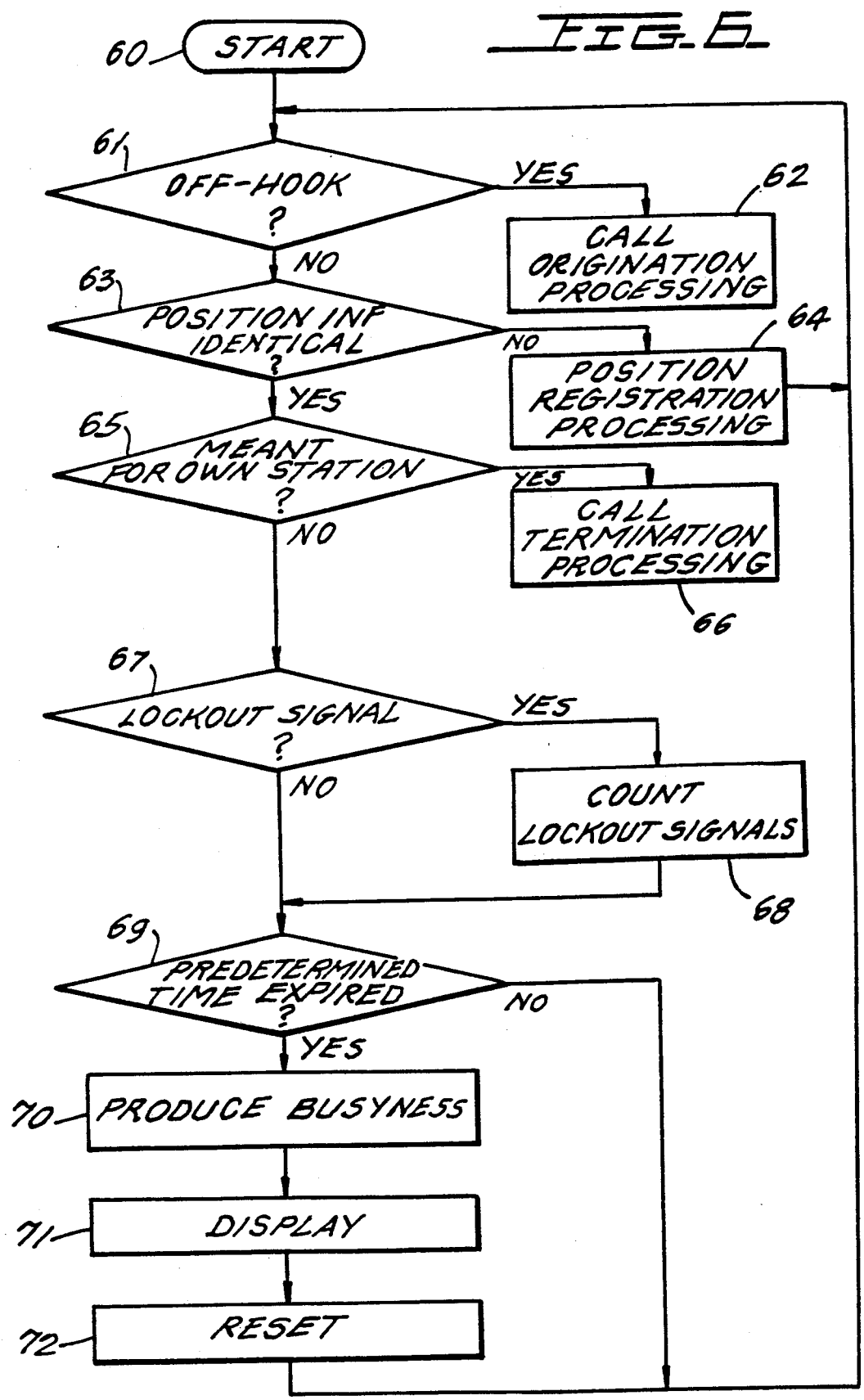

MOBILE TELEPHONE SYSTEM FOR PRODUCING BUSYNESS INFORMATION FOR SPEECH CHANNELS

BACKGROUND OF THE INVENTION

The present invention relates to a mobile telephone system and, more particularly, to vehicle-mounted or on-board telephone equipment which serves as a mobile station in a mobile telephone system.

A mobile telephone system has on-board telephone equipment mounted on individual vehicles to serve as mobile stations, base stations each being assigned to a different service area for interchanging information with on-board equipment existing in the service area, a control station for supervising a plurality of base stations, and a mobile telephone switching station interconnecting the control station and a switched telephone network.

To hold a communication with desired on-board telephone equipment on an ordinary telephone set, a control station supervising a particular base station which offers a service area where the desired equipment exists is called by a telephone network to which the ordinary telephone set is interconnected, via a mobile telephone switching station. In response, the control station calls the desired on-board equipment via the base station.

On the other hand, to originate a call on the on-board equipment, the control station is called via the particular base station offering the service area where the on-board equipment exists. In response, the control station assigns message channels to the service area to allow the on-board equipment to hold a communication.

A problem with the mobile communication system is that when no idle channels are available due to the increase in the amount of communications, no communications can be held, i.e., a communication is allowed only when any of the channels having been occupied becomes idle. It has been customary, therefore, to repetitively send a call request until an idle channel has been seized.

SUMMARY OF THE INVENTION

It is therefore an object of the present invention to provide on-board telephone equipment for a mobile telephone system which allows a communication to be held even when the amount of communications is increased, without resorting to repetitive call origination.

In a preferred embodiment of the mobile telephone system in accordance with the present invention, electric field levels of a plurality of message channels which are assigned to a service area are detected. When the electric field level of any of the message channels is higher than a predetermined level, that message channel is determined to be busy. The degree of busyness of message channels is calculated by using the total number of message channels assigned to a service area and the number of busy voice channels. The calculated busyness is displayed as information indicative of the busyness of message channels.

In another preferred embodiment of the present invention, a lockout signal transmitted from a control station and indicative of the fact that no message channels are idle is detected. The number of times that the lockout signal appears within a predetermined period of time is determined and displayed as information representative of the degree of busyness of message channels.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIG. 3 is a block diagram schematically showing on-board equipment included in the FIG. 1 embodiment;

FIG. 4 is a flowchart demonstrating a specific operation of a controller included in the FIG. 3 controller;

FIG. 5 is a block diagram schematically showing an alternative embodiment of the present invention; and FIG. 6 is a flowchart demonstrating a specific operation of a controller included in the embodiment of FIG. 5.

DETAILED DESCRIPTION OF THE PREFERRED EMBODIMENTS

Figure 1:
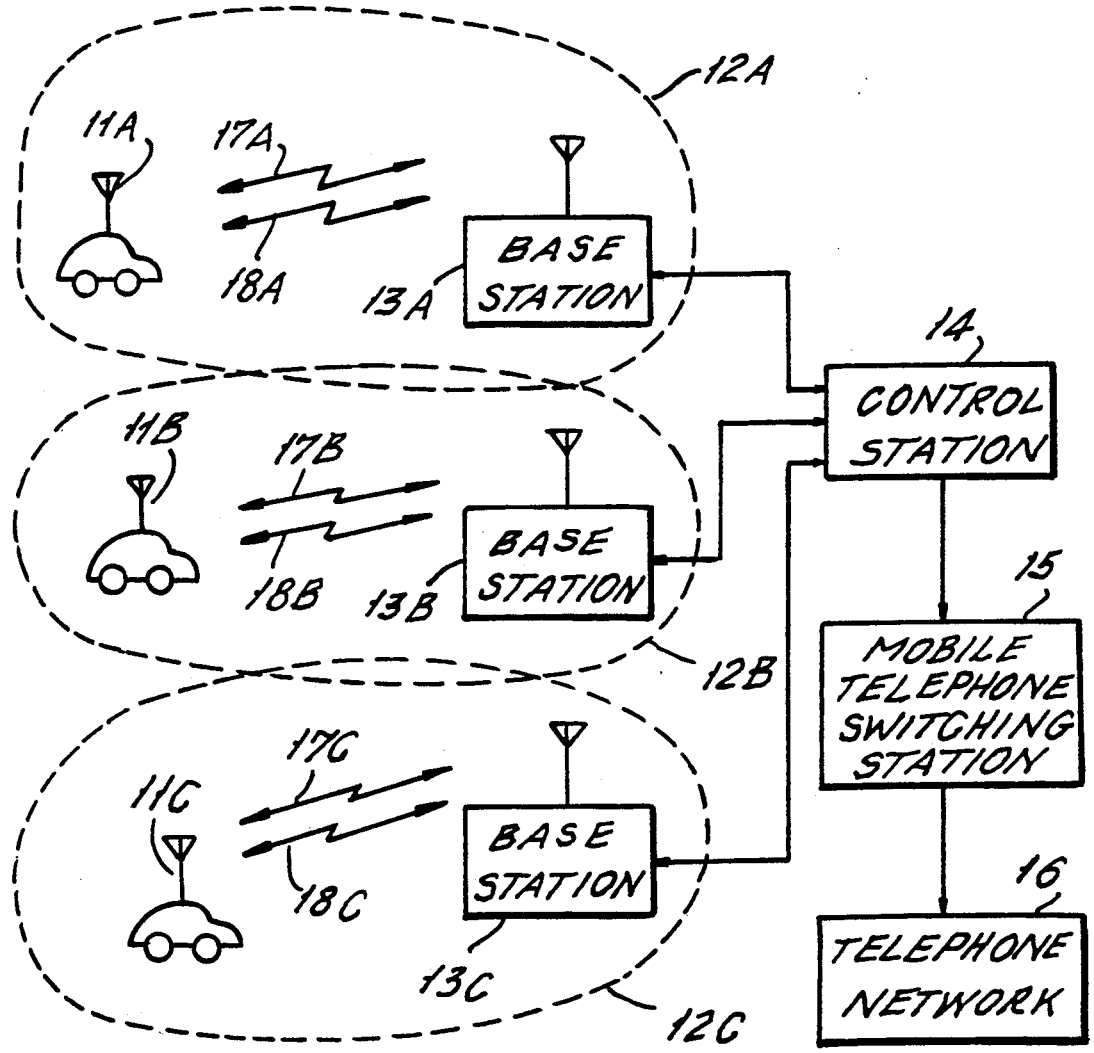
FIG. 1 is a block diagram schematically showing a mobile telephone system embodying the present invention.

Referring to FIG. 1 of the drawings, a mobile telephone system embodying the present invention is shown and includes on-board telephone equipment 11 (11A, 11B and 11C) mounted on individual vehicles. Base stations 13 (13A, 13B and 13C) each interchanges control information and message information with the on-board equipment 11 which exists in a service area 12 (12A, 12B or 12C) which the base station monitors. The base stations 13 are controlled by a control station 14 which is interconnected to a telephone network 16 by a mobile telephone switching station 15.

Speech or message channels 17 (17A, 17B and 17C) and control channels 18 (18A, 18B and 18C) are provided between the individual on-board equipment 11 and the associated base stations 13. The same kinds of channels as these channels are provided between the base stations 13 and the control station 14. The message channels 17 are used to transmit and receiver message information, while the control channels 18 are used to interchange control information necessary for call origination processing.

Specifically, a plurality of message channels are assigned to each base station 13 and have frequencies different from frequencies assigned to the other base stations 13. This is successful in preventing the message channels of nearby base stations 13 from interfering with each other. For example, assuming that the message channels 17A assigned to the base station 13A have carrier frequencies f1, f3, f5, f7 and f9, then the message channels 17B assigned to the base station 13B whose service area overlaps with the service area of the base station 13A will have carrier frequencies f0, f2, f4, f6 and f8 belonging to a frequency band different from a band of f1, f3, f5, f7 and f9. To the base station 13C whose service area does not overlap with that of the base station 13A, the same carrier frequencies, f1, f3, f5, f7 and f9 as the base station 13A are assigned as the message channels 17C.

The control channel 18 is made up of four different control channels: a first call termination control channel for the control station 14 to send call termination information to desired on-board equipment 11 via the associated base station 13, a second call termination control channel for the on-board equipment 11 to send answer information to the control station 14 via the base station 13 in response to the call termination information, a first call origination control channel for the on-board equipment 11 to send a call signal to the control station 14 via the base station 13, and a second call origination control channel for the control station 14 to send answer information to the on-board equipment 11 via the base station 13 in response to the call signal.

Figure 2:
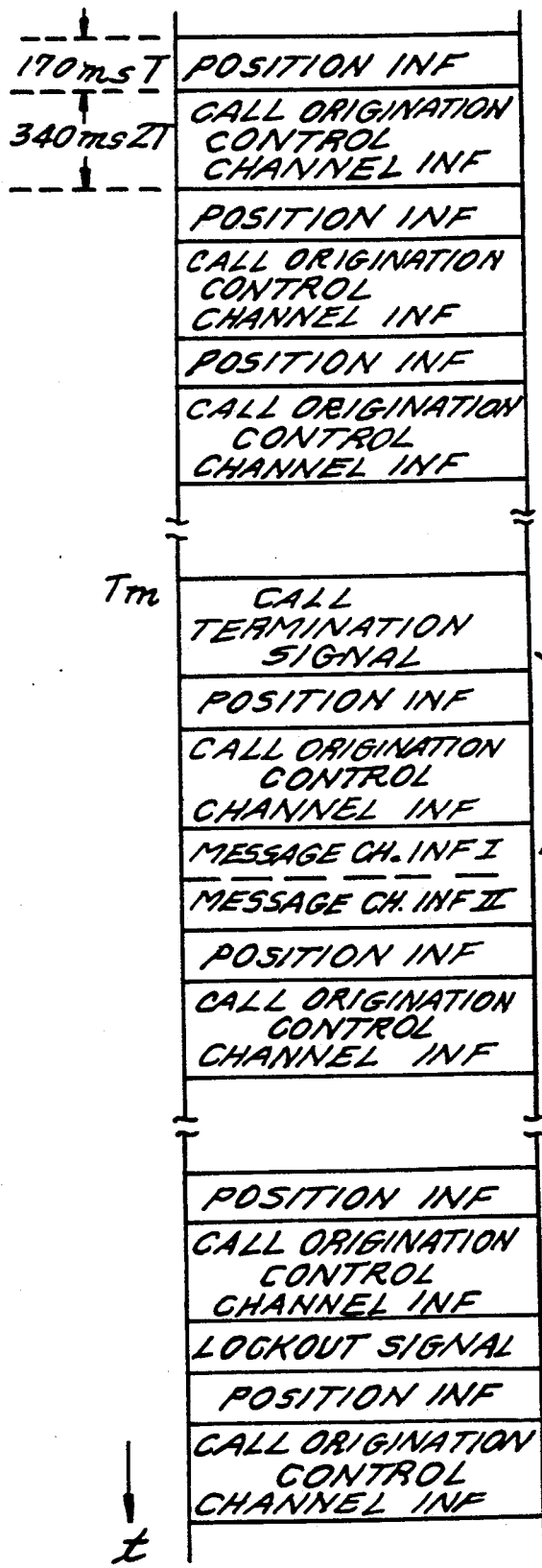
FIG. 2 is a chart showing the format of control channels for transmitting control information in the embodiment of FIG. 1.
Figure 2:
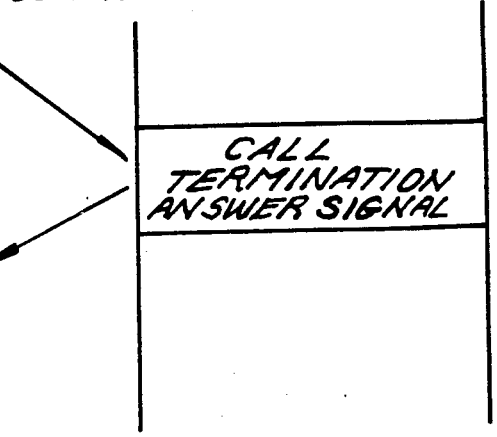

As shown in FIG. 2, the information is transmitted over the first call termination control channel 18-1 by using a time slot T whose duration is 170 milliseconds as a unit. Usually, the control station 14 repetitively transmits position information in one time slot T and call origination control channel information in two time slots 2T via the base stations 13. The position information and call origination control channel information are the same as those of the conventional system and, therefore, will not be described for simplicity.

When a call is to be terminated at particular on-board equipment 11, the control station 14 sends in a time slot Tm, for example, a call termination signal designating the telephone number of the equipment 11 over the first call termination control channel 18-1. Thereafter, the control station 14 resumes the repetitive transmission of position data and call origination control channel information.

On detecting the call termination signal, the on-board equipment 11 having the designated telephone number returns an answer signal to the control station 14 over the second call termination control channel 18-2. In response, the control station 14 transmits message channel information in first and second time slots for allocating a message channel to the on-board equipment 11 over the first call termination control channel 18-1. Specifically, the control station 14 sends telephone number information associated with the destination 11 in the first time slot and then sends message channel number information in the second time slot. So sending the telephone number information associated with the destination 11 in the first time slot allows only the on-board equipment for which the call is meant to receive the message channel information. On receiving the message channel information, the on-board equipment 11 is ready to communicate with a calling station over the designated message channel.

When all the available message channels are occupied due to heavy traffic, the control station 14 sends over the first call termination control channel 18-1 a lockout signal indicating that none of the message channels is idle.

When a call is originated on the on-board equipment 11, the equipment 11 sends a call origination signal to the control station 14 over the first call origination control channel. In response, if any message channel is idle, the control station 14 sends message channel information to the equipment 11 over the second call origination control channel. If no message channels are idle, then the control station 14 sends the lockout signal to the equipment 11 over the first call termination control channel 18-1.

Once the lockout signal is sent, a communication cannot be held despite call originating operations because no message channels can be assigned. More specifically, a communication is allowed only when at least one of the on-board equipment 11 in communication ends its communication to release the message channel. With the prior art mobile telephone system, the user of the on-board equipment 11 cannot see if any of the busy message channels has become idle and, therefore, has to try to originate a call repeatedly until the user seizes an idle message channel.

In the light of the above, the illustrative embodiment is constructed and arranged such that each on-board equipment 11 detects the electric field level of each of the plurality of message channels assigned to each service area 12. When the detected electric field level is higher than a predetermined level, the equipment 11 determines that the message channel is busy. Further, the equipment 11 compares the number of message channels assigned to the service area 12 with the number of message channels having been determined to be busy, thereby calculating the degree of busyness of the message channels. The busyness is displayed on the equipment as information indicative of how heavy the traffic is. By watching the busyness being displayed, the user can see the degree of busyness of the assigned message channels.

Referring to FIG. 3, the on-board equipment 11 shown in FIG. 1 will be described in detail. As shown, the on-board equipment 11 has a telephone set 21, a controller 22, a transmitter 23, a receiver 24, an antenna duplexer 25, a transmit/receive antenna 26, and a frequency synthesizer 27 for generating signals having frequencies lying in the frequency band assigned to the message channels.

The transmitter 23 and receiver 24 are interconnected to the antenna 26 via the antenna duplexer 25. The transmission and reception frequencies of the transmitter 23 and receiver 24, respectively, are individually changed by the output signal of the frequency synthesizer 27. The controller 22 interchanges control information and message signals via the transmitter 23 and receiver 24. Further, the controller 22 controls the frequency synthesizer 27 to change the transmission and reception channels of the transmitter 23 and receiver 24, respectively.

While the on-board equipment 11 is in a stand-by condition with no communication being held thereon, the receiver 24 receives control information being sent from the control station 14 over the first call termination control channel. The control information is fed from the receiver 24 to the controller 22. The controller 22, in turn, executes control processing or call termination processing on the basis of the received control information. In the event of call origination, the controller 22 executes call origination processing on sensing an off-hook signal which will be fed thereto from the telephone set 21. Such processing is the same as with conventional mobile telephone equipment.

In the stand-by condition, the on-board equipment 11 constantly detects and displays the busyness of the message channels. For this purpose, the equipment 11 has a field level detector 28 responsive to the electric field level of each message channel assigned to the associated base station 13, and a display 29 for displaying the busyness of message channels.

While the controller 22 controls the frequency signal from the frequency synthesizer 27, the field level detector 28 is responsive to the controlled frequency signal for determining the electric field level $S_1$ on all the message channels available in the service area where the on-board equipment exists. Concerning the equipment 11 situated in the service area 12A, for example, the field level detector 28 detects the electric field levels of the message channels f1, f3, f5, f7 and f9. The electric field level is high on a busy message channel because a radio frequency assigned to that channel is being transmitted. More specifically, the electric field level noticeably differs from such a busy channel to an idle channel over which no radio frequencies are being transmitted. Therefore, whether or not a message channel is busy can be seen if the electric field level of that channel is detected.

The detected electric field levels $S_1$ are applied to the controller 22. Then, the controller 22 compares the electric field levels $S_1$ one by one with a predetermined threshold level to see if their associated message channels are busy. The controller 22 calculates the busyness of the message channels on the basis of the number of message channels assigned to the service area and the number of message channels which it has determined to be busy. The resulted busyness appears on the display 29.

A reference will be made to FIG. 4 for describing the busyness detecting processing executed by the controller 22, i.e., from the detection of the electric field levels $S_1$ to the indication of the busyness of message channels on the display 29.

As shown in FIG. 4, the busyness detection processing begins when a stand-by condition is set up wherein the on-board equipment 11 receives the first call termination control channel 18-1 (step 30). When the controller 22 detects an off-hook signal generated by the telephone set 21 (step 31), it starts call origination processing (step 32). The controller 22 compares position information coming in over the first call termination control channel 18-1 with registered position information (step 33). If the answer of the step 33 is negative (N), the controller 22 executes position registration processing in exactly the same manner as a prior art system (step 34). If the answer of the step 33 is positive (Y), the controller 22 determines whether or not a call termination signal transmitted over the first call termination control channel 18-1 is meant for the own station (step 35). If the answer of the step 35 is positive (Y), the controller 22 executes call termination processing in exactly the same manner as the prior art system (step 36).

Assume that the controller 22 has detected a time slot of the control information which has nothing to do with the own station, i.e., call origination control channel information or message channel information meant for another on-board equipment which is transmitted after the position information (Y, step 37). Then, the controller 22 sequentially selects the message channels assigned to the current service area out of a memory (step 38) so as to detect their electric field levels $S_1$ (step 39). If the detected electric field level is higher than the threshold level (Y, step 40), the controller 22 determines that the associated message channel is busy and sets a BUSY flag (step 41). If the answer of the step 40 is negative (N), the controller 22 determines that the message channel of interest is idle and resets the BUSY flag (step 42).

The step 41 or 42 is followed by a step 43 for restoring the on-board equipment 11 to the receiving condition to receive the first call termination control channel. In a step 44, the controller 22 determines whether or not all the message channels assigned to the service area of interest have been checked as to the electric field level. If the answer of the step 44 is negative (N), the program returns to the step 31. If the answer of the step 44 is positive (Y), the controller 22 counts the busy message channels to determine the rate of use of the message channels (step 45) while displaying it on the display 29 (step 46). As soon as the busyness appears on the display 29, the count of the busy message channels is cleared (step 47). Then, the program returns to the step 31 for repeating the above-described procedure. It is to be noted that the information appearing on the display 29 is maintained until the result of next detection has been produced.

In the illustrative embodiment wherein the message channels differ in frequency from one service area to another, a memory is built in the controller 22 and loaded with the frequencies of message channels on an area-by-area basis. Specifically, only the message channels assigned to a service area of interest are checked as to the electric field level. This is successful in preventing the controller 22 from wastefully detecting the electric field levels of message channels which are not necessary.

The embodiment shown and described allows the user of the on-board equipment 11 to see the busyness of the message channels in the service area where the equipment 11 exists, merely by watching the display 29.

Referring to FIG. 5, an alternative embodiment of the present invention is shown which is essentially the same as the previous embodiment except for a part of the construction of the on-board equipment. Specifically, on-board equipment 50 shown in FIG. 5 has a telephone set 51, a controller 52, a transmitter 53, a receiver 54, an antenna duplexer 55, a transmit/receive antenna 56, and a frequency synthesizer 57 for generating signals having frequencies lying in the frequency band assigned to message channels. The equipment 50 is identical with the equipment 11 except that it lacks the field level detector 28 and that the controller 52 executes busyness detection processing.

The controller 52, like the controller 22, performs control processing, call termination processing and call origination processing in the conventional manner.

The controller 52 starts on the detection of the degree of busyness of message channels by detecting the lockout signal which may be received over the first call termination control channel 18-1.

Generally, in a mobile telephone system, the number of message channels which may be assigned to a service area is limited. Hence, as the amount of communications being held increases, the number of message channels available becomes small with the result that the lockout signal appears more frequency. Specifically, the number of times that the lockout signal is sent and the busyness of message channels are correlated. In the alternative embodiment, the number of lockout signals having appeared within a predetermined period of time is determined and compared with a threshold value to determine the busyness of message channels.

By actual measurements, it was found that, among various control information which may be transmitted over the first call termination control channel 18-1, the position information and call origination control channel information occupies approximately 50 percent of the whole period of time.

Assume that 50 percent of all the on-board equipment (mobile stations) existing in a certain service area are ready to receive a call, while the others are not ready to do so because their power sources are in an off state, for example. Then, information other than the position information and call origination control channel information which are sent over the first call termination control channel 18-1, i.e., a call termination signal, message channel information and lockout signal are transmitted in the following combinations:

(1) To mobile station whose power source is off call termination signal + call termination signal
    (i.e. base station sends a call termination signal twice)

(2) To mobile station whose power source is on, when an idle message channel exists call termination signal + message channel
    information I + message channel information II (3) To mobile station whose power source is on, when an idle message channel does not exists call termination signal + lockout signal Here, each of call termination signal, message channel information I and II, and lockout signal is transmitted in one time slot.

It follows that when 50 percent of the mobile stations are in the power-on condition and no idle message channels are available, there appears, among the call termination signal, message channel information and lockout signal, the lockout signal at a rate of once per four times. Under the same conditions, when the idle message channel is not available at a rate of once per twice, the lockout signal appears once per nine times.

Assuming that the above-mentioned predetermined time is 3 minutes (180 seconds), then the position information and call termination control channel information will be transmitted over 90 seconds while the other information (call termination signal, message channel information and lockout signal) will be transmitted over 90 seconds. Since one time slot is 0.17 second (170 milliseconds), when the ratio of the number of idle message channels to all the message channels is 0%, the lockout signal will be transmitted at a frequency:

$$\frac{90}{0.17} \cdot \frac{1}{4} = 132 \text{ times/3 minutes}$$

Further, when the ratio of the number of idle message channels to all the message channels is 50%, the lockout signal will appear at a frequency:

$$\frac{90}{0.17} \cdot \frac{1}{9} = 59 \text{ times/3 minutes}$$

This embodiment, therefore, determines that the message channels are extremely busy when the lockout signal is received more than fifty-nine times within the predetermined period of time (3 minutes), because the number of idle message channels available at that time is less than 50%.

A reference will be made to FIG. 6 for describing the busyness detection processing executed by the controller 52, i.e., from the step of determining the number of lockout signals having appeared within the predetermined period of time to the step of displaying it on the display 58.

In FIG. 6, the processing begins when the on-board equipment 11 is brought into a stand-by condition in which it receives the first call termination control channel 18-1 (step 60). When the controller 52 senses an off-hook signal generated by the telephone set 51 (step 61), it starts on call origination processing (step 62). The controller 52 compares position information transmitted over the first call termination control channel 18-1 with the registered position information (step 63) and, if they do not compare equal, executes position registration processing in exactly the same manner as a conventional system (step 64). The controller 52 determines whether or not the call termination signal come in over the channel 18-1 is meant for the own station (step 65). If the answer of the step 65 is positive (Y), the controller 52 performs call termination processing in the conventional manner (step 66).

When a lockout signal is detected (step 67), the controller 52 increments a counter by one (step 68) and then determines whether or not a predetermined period of time has expired (step 69). If the answer of the step 69 is negative (N), the program returns to the step 61. If the answer of the step 69 is positive (Y), the controller 52 produces busyness information on the basis of the count of the counter and a reference value (e.g. "59") (step 70). The resulted busyness information appears on the display 58 (step 71). On the appearance of the busyness information on the display 58, the counter is reset (step 72). Thereafter, the program returns to the step 61 to repeat the above-described sequence of steps. The information appearing on the display 58 will be maintained until the controller 52 produces the result of next detection.

Although the invention has been described with reference to specific embodiments, this description is not meant to be construed in a limited sense. Various modifications of the disclosed embodiments will becomes apparent to persons skilled in the art upon reference to the description of the invention. It is therefore contemplated that the appended claims will cover any modifications or embodiments as fall within the true scope of the invention.

We claim:

1. Vehicle-mounted telephone equipment for communicating with a base station by using one of a predetermined number of radio message channels, comprising:
   detecting means for detecting a respective electric field level of each of said predetermined number of message channels to produce a respective detected electric field level;
   counting means responsive to said detected electric field levels for counting the number of the message channels whose electric field levels are higher than a predetermined level; and
   means for comparing the counted number to a preset number and for producing busyness information when said counted number exceeds said predetermined number.

2. Telephone equipment as claimed in claim 1, further comprising means for indicating said busyness information.

3. Telephone equipment as claimed in claim 1, further comprising means for detecting a control signal not meant for said telephone equipment out of control signals which are sent from the base station.

4. Telephone equipment as claimed in claim 1, further comprising memory means for storing frequencies of the predetermined number of message channels.

5. Telephone equipment as claimed in calim 1, further comprising means for activating said detecting and counting means when a stand-by mode is set up.

6. Vehicle-mounted telephone equipment for executing processing for a communication in response to control signals sent from a base station and communication with said base station over a selected one of a predetermined number of message channels, said telephone equipment comprising:

detecting means for detecting among said control signals an intermittently occurring lockout signal which is active when none of said message channels are idle;

counting means for counting the number of activations of said lockout signal within a predetermined period of time; and calculating means for producing busyness information indicative of a condition wherein said message channels are used by using said number, said calculating means comprising comparing means for comparing the number of lockout signals counted with a predetermined number to produce a resultant output as said busyness information.

* * * * *